UNITED STATES PATENT OFFICE.

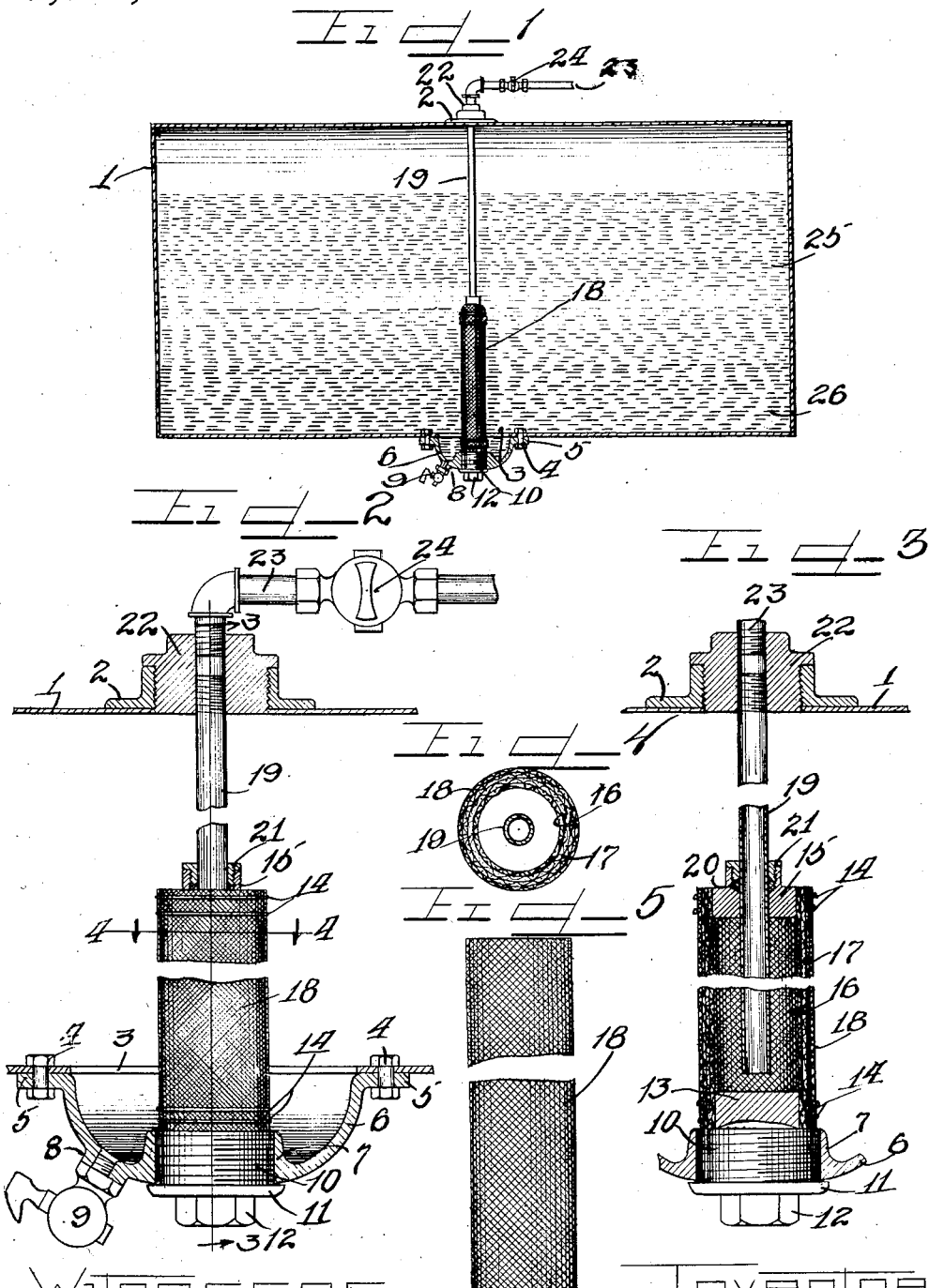

HENRY A. HILLS, OF GRAND RAPIDS, MICHIGAN.

FILTER FOR GASOLENE-TANKS.

1,394,011.  Specification of Letters Patent.  Patented Oct. 18, 1921.

Application filed September 4, 1917. Serial No. 189,550.

*To all whom it may concern:*

Be it known that I, HENRY A. HILLS, a citizen of the United States, and a resident of the city of Grand Rapids, in the county of Kent and State of Michigan, have invented certain new and useful Improvements in a Filter for Gasolene-Tanks; and I do hereby declare that the following is a full, clear, and exact description of the same, reference being had to the accompanying drawings, and to the numerals of reference marked thereon, which form a part of this specification.

This invention relates to an improved form of filter, adapted for use in gasolene tanks, and comprises a drain trap rigidly secured to the bottom of the tank to cover an opening therein, said trap having removably secured thereon a filter element which projects into the tank and has an outlet pipe leading from the upper end thereof upwardly through the top of the tank to permit pure filtered gasolene to be drawn from said tank, said filter element being provided with a specially treated fabric filter screen which permits gasolene only to filter therethrough and is impervious to water and other impurities carried by the gasolene in the tank, which impurities may be drawn off through said drain trap.

It is an object of this invention to construct an improved form of filter for gasolene tanks wherein a specially prepared fabric filter screen is provided to permit gasolene only to filter therethrough, said fabric screen being impervious to water and other impurities carried by the gasolene.

It is also an object of this invention to provide a filter for gasolene tanks, embracing a plug adapted to be removably secured in the base of the tank and having a filter element on the inner end thereof projecting into the tank and having an outlet pipe connected thereto to permit filtered gasolene to be drawn off through the top of the tank.

It is furthermore an object of this invention to construct a gasolene filter for a gasolene tank, which projects upwardly inside the tank and is provided with a valved outlet at the top of the tank, and a drain trap mechanism at the bottom of the tank to draw off water and impurities which remain in the tank due to the fact that a specially prepared filter screen provided for the filter is impervious thereto and permits gasolene only to filter therethrough.

Other and further important objects of this invention will be apparent from the disclosures in the specification and drawings.

The invention (in a preferred form) is illustrated in the drawings and hereinafter more fully described.

On the drawings:

Figure 1 is a longitudinal vertical section taken centrally through a gasolene tank having a gasolene filter embodying the principles of this invention mounted therein.

Fig. 2 is an enlarged fragmentary front plan view of the filter and the connections therefor showing the supporting means and parts of the tank in section.

Fig. 3 is a section taken on line 3—3 of Fig. 2, with parts shown in elevation and parts omitted.

Fig. 4 is a section taken on line 4—4 of Fig. 2.

Fig. 5 is a side elevational view of the filter element.

As shown on the drawings:

The reference numeral 1, indicates a gasolene tank or reservoir of any desired type adapted for use on automobiles or other vehicles using gasolene as a fuel, said tank having an opening in the top thereof. Soldered or rigidly secured by other suitable means upon the top of the tank 1, is an internally threaded collar 2, the opening of which registers with the opening in the top of said tank. Formed in the bottom of the tank 1, directly below the top opening of said tank is a large drain opening 3, the margin thereof having a plurality of apertures therein through which retaining bolts 4, project outwardly through suitable apertures provided in a flange 5, of a drain cup or trap 6, to securely hold said drain trap bolted in position below the tank and forming an air-tight joint therewith. The trap 6, has integrally formed centrally on the inner surface thereof a neck or collar 7, which, together with said trap, is drilled to provide an internally threaded opening for a purpose hereinafter described. Integrally formed on the exterior and to one side near the lower portion of the trap 6, is a neck piece 8, having a threaded opening therein to receive the threaded end of a pet-cock or drain faucet 9, therein.

Removably but securely threaded into the collar 7, is a gasolene filter element comprising an externally threaded bushing or plug 10, provided on the lower or outer end with an integral flange 11, and a head 12 with flattened sides to permit the filter element to be mounted or threaded into position. Integrally formed on the upper or inner end of the plug 10, is a boss 13, of a diameter less than that of said plug. Rigidly secured by means of wires or cords 14, to the boss 13, is the lower end of a cylindrical filter element, the upper open end of which is plugged with an axially passaged plunger head 15, to which said filter screen is secured by means of retaining wires or cords 14. The filter screen which forms an important part of the filter comprises a cylindrical inner casing or tubing 16, open at both ends and made of wire screening. Said inner wire tube 16, has wrapped therearound a double layer of specially treated cloth or knit fabric forming an intermediate filter element or filter tube 17, preferably made of a single piece of the knit fabric rolled to overlap itself to form the double thickness. Disposed around the knit fabric tube 17, is an outer tube or casing 18, made of wire screening. The intermediate layers of the filter element are made of cloth or a knit fabric, specially prepared and subjected to a suitable chemical water-proofing treatment which renders it impervious to water so that gasolene only is permitted to filter therethrough into the interior of the filter. Any water, dirt and other impurities carried by the gasolene remain in the tank 1. The outer and inner wire screen elements 18 and 16, of the filter, act as a supporting and protecting means for the knit fabric, as well as a filter for the gasolene. The outer screen being preferably of fine mesh prevents any water globules from immediately contacting the filtering fabric and assists in the filtration of the gasolene from the contents of the tank.

Projecting vertically through the passaged head 15, is an outlet pipe 19, the lower end of which extends into the filter screen element to within a short distance of the boss 13, while the upper end is threaded and projects unwardly through the opening in the top of the tank, and terminates a short distance below the upper end of the collar 2. To form an air-tight joint around the pipe 19, where the pipe passes through the head 15, the upper end of the head passage is enlarged and threaded to receive a packing 20, held seated therein by means of a threaded bushing 21, surrounding said pipe and removably threaded into the enlarged threaded end of the head passage. To hold the upper end of the pipe 19, in position and to close the opening in the collar 2, an externally threaded flanged cap 22, having an axial threaded passage therein, is threaded into the collar 2, and on the threaded upper end of the pipe 19, to permit the flanged portion thereof to seat upon the upper end of said collar. To permit the pure filtered gasolene from the filter to be drawn therefrom, an outlet pipe 23, having a controlling valve 24, therein, is removably connected with the cap 22.

The operation is as follows:

The gasolene filter element is mounted within the tank 1, as shown in Fig. 1, with the filter screen portions extending to a point approximately half way between the top and bottom of the tank. The tank 1, may now be filled with commercial gasolene through a suitable supply opening (not shown) or if desired, through the opening in the top of the tank when the cap 22, is removed. Due to the fact that gasolene has a lower specific gravity than water and other impurities carried in commercial gasolene, the gasolene 25, tends to rise and fill the upper portion of the tank, while the water and impurities denoted by the reference numeral 26, sink to the lower portion of the tank.

The specially treated fabric filter screen 17, being impervious to the water and impurities 26, and being additionally reinforced with a fine wire mesh or gauze on both sides, permits gasolene only to percolate therethrough into the interior of the filter element from where the pure filtered gasolene is drawn upwardly by suction through the pipe 19, and out through the outlet pipe 23, when the controlling or outlet valve 24, is open. The pet-cock 9, when opened, permits all water and impurities to be drawn off from the tank through the trap 6.

The filter element may be readily inserted into or removed from the tank for cleaning by means of the plug 10, to which the filter element is secured. The construction is such that it will retain its efficiency for many years.

I am aware that various details of construction may be varied through a wide range without departing from the principles of this invention, and I therefore do not purpose limiting the patent granted otherwise than necessitated by the prior art.

I claim as my invention:

1. The combination with a gasolene tank, of a drain trap secured thereto, a gasolene filter means impervious to water and removably projecting through said trap and into the interior of said tank to filter the gasolene contained within said tank and means connected to the filter to permit the gasolene to be drawn off from the top of the tank.

2. The combination with a gasolene tank, of a drain trap secured thereto, a pet-cock connected therewith, filter means impervious to water projecting through said trap and into the tank to filter gasolene contained within said tank, and outlet means for filtered gasolene connected to the upper end of said filter means, said pet-cock adapted to be opened to draw off water and other impurities from the bottom of the tank after the gasolene has been separated therefrom by said filter means.

3. In a device of the class described the combination with a gasolene tank having an opening in the top and bottom thereof, of a drain mechanism secured to the bottom of said tank to inclose said bottom opening, means removably secured to said drain mechanism projecting upwardly into said tank, threaded means closing said top opening, a filter element secured to said means and connected with said threaded means adapted to permit gasolene only to filter therethrough and being impervious to water and other impurities, and valved outlet means connected with said threaded means for drawing off the filtered gasolene, said drain mechanism permitting the water and impurities remaining in said tank to be drained therefrom.

4. In a device of the class described the combination with a gasolene tank, of a drain trap secured thereon, a plug removably secured in an opening thereof, a filter element rigidly secured on said plug projecting into said tank, a head secured thereon, a fabric filter screen forming a part of said filter element, a pipe projecting through said head into said filter element with the upper end of said pipe projecting out through an opening in the top of said tank, means closing said opening in the top of said tank and engaging said pipe to hold the same in position, and outlet means for gasolene which has been filtered through said fabric filter screen, said fabric filter screen adapted to be impervious to impurities carried by gasolene in said tank which are drawn off through said drain trap.

In testimony whereof I have hereunto subscribed my name in the presence of the subscribing witness.

HENRY A. HILLS.

Witness:
EARL M. HARDINE.